United States Patent [19]
Ash et al.

[11] Patent Number: 5,559,877
[45] Date of Patent: Sep. 24, 1996

[54] AUTOMATIC PROVISIONING OF TRUNKING AND ROUTING PARAMETERS IN A TELECOMMUNICATIONS NETWORK

[75] Inventors: Gerald R. Ash, West Long Branch; Kenneth K. Chan, Eatontown; Jiayu Chen, Middletown, all of N.J.; Alan E. Frey, Naperville, Ill.; James J. Gallagher, Bridgewater, N.J.; Andrew W. Peck, Wheaton, Ill.

[73] Assignee: AT&T, Holmdel, N.J.

[21] Appl. No.: 407,171

[22] Filed: Mar. 21, 1995

[51] Int. Cl.⁶ ...................................................... H04M 7/00
[52] U.S. Cl. .......................... 379/221; 379/229; 379/219; 379/269
[58] Field of Search ..................... 379/201, 202, 379/219, 220, 221, 230, 242, 258, 269, 112, 207, 265, 229

[56] References Cited

U.S. PATENT DOCUMENTS

| | | | |
|---|---|---|---|
| 4,956,835 | 9/1990 | Grover | 370/16 |
| 4,991,204 | 2/1991 | Yamamoto et al. | 379/221 |
| 5,014,262 | 5/1991 | Harshavardhana | 379/221 |
| 5,058,105 | 10/1991 | Mansour et al. | 379/221 |
| 5,136,581 | 8/1992 | Muehrcke | 379/202 |
| 5,142,570 | 8/1992 | Chaudhary et al. | 379/230 |
| 5,282,244 | 1/1994 | Fuller et al. | 379/230 |
| 5,375,167 | 12/1994 | Bales et al. | 379/230 |
| 5,377,262 | 12/1994 | Bales et al. | 379/230 |
| 5,390,242 | 2/1995 | Bales et al. | 379/230 |
| 5,450,482 | 9/1995 | Chen et al. | 379/230 |

*Primary Examiner*—Jeffery Hofsass
*Assistant Examiner*—Scott Wolinsky
*Attorney, Agent, or Firm*—Frederick B. Luludis

[57] ABSTRACT

A telecommunication network may be arranged in accord with the invention so that a change in provisioning data occurring at one element of the network is automatically supplied to the other elements of the network, thereby eliminating the need of having a network administration facility to communicate manually the change to the other network elements. For example, if a local central office switch is rehomed from a first toll switch to a second toll switch, then the first and second toll switches form messages respectively characterizing the rehome and then send the messages to each of the other network toll switches so that the other toll switches may update their respective routing and trunking data relating to the rehomed switch. The network is also arranged to implement a rule-based, end-to-end routing scheme which automatically selects a routing path from multiple candidates based on (a) class-of-service parameters and (b) availability of network capacity. The automatic selection of a routing path thus replaces the provisioning of routing data in the toll switches, which data was priorly needed to select the appropriate routing path.

25 Claims, 12 Drawing Sheets

TRUNK GROUP PROFILE

| NEAR-END TERMINATION | FAR-END SWITCH | FAR-END TERMINATION | TRANSPORT CAPABILITY | TYPE | CSC |
|---|---|---|---|---|---|
| 306 | 215 | 416 | VOICE | INTERTOLL | SIGNAL PROCESSING APPLICATION |
| 307 | 220 | 421 | VOICE | INTERTOLL | – |
| 308 | 220 | 411 | VOICE | INTERTOLL | MF SIGNAL DETECTION |
| 309 | 220 | 412 | DATA | INTERTOLL | – |
| 310 | 210 | 486 | VOICE | INTERTOLL | – |
| ⋮ | ⋮ | ⋮ | ⋮ | ⋮ | ⋮ |
| XXX | YYY | ttt | VOICE | INTERTOLL | – |

TRUNK GROUP PROFILE

| NEAR-END TERMINATION | FAR-END SWITCH | FAR-END TERMINATION | TRANSPORT CAPABILITY | TYPE | CSC |
|---|---|---|---|---|---|
| ⋮ | ⋮ | ⋮ | ⋮ | ⋮ | ⋮ |
| 411 | 205 | 308 | VOICE | INTERTOLL | – |

FIG. 4

| NAD PROFILE | | | | | | | | |
|---|---|---|---|---|---|---|---|---|
| ID | TYPE | CUSTOMER | NUMBERING PLAN | TELEPHONE CODES | | DESTINATION I.D. | RT TYPE | TC | CSC |
| HOLMNJ01T | LEC CO | BELL ATLANTIC | NANP | 908-949-0001-949-9999 | ... | HOMNJAJ | ALT. RT. | VOICE | – |
| | | | | | | MTNJ10T | ALT. RT. | VOICE | – |

*FIG. 5*

| TRUNK GROUP PROFILE | | | | | |
|---|---|---|---|---|---|
| TRUNK GROUP I.D. | FAR-END NAD I.D. | FAR-END SWITCH I.D. | TYPE | TC | CSC |
| 3HOLMNJ01T | HOLMNJ01T | – | SWITCHED ACCESS (CO) | VOICE/ 64KbS | – |

500

501 502 503 504 505 506

5,559,877

AUTOMATIC PROVISIONING OF TRUNKING AND ROUTING PARAMETERS IN A TELECOMMUNICATIONS NETWORK

FIELD OF THE INVENTION

The invention relates to an automatic provisioning arrangement for use in a telecommunications system.

BACKGROUND OF THE INVENTION

When a new telecommunication switch is added to a telecommunications network, it is likely that the routing and trunking data that will be used by that switch for the routing of telephone calls will be loaded into the new switch from a central location, such as a Network Service Provisioning Center (NSPC). Some of the routing and trunking data are also loaded locally at the switch by a craftsperson. Also, the routing and trunking data that all other switches in the network will need to route calls to the new switch are loaded, at about the same time, into those switches in a similar manner. One aspect of such a procedure is that the provisioning of trunking data must be coordinated with the provisioning of routing data since trunking and routing are separate processes. That is, if the transport capability of a group of trunks connecting to a destination changes, then the routing data at all other switches of the associated network need to be updated to reflect that change. For example, if a local Central Office (CO) is "rehomed" from one toll switch to another toll switch, then the routing tables in the other toll switches of the associated toll network need to be updated to change the way in which the toll switches route calls to the local CO. Moreover, such updating is typically done from the NSPC and is done at each of the toll switches almost at the same time to minimize the incorrect routing of calls destined for the local CO—which means that the routing data for each such switch needs to be correct and entered correctly into the associated routing table.

It can be appreciated from the foregoing discussion that the provisioning of routing and trunking data in a telecommunications network is indeed complex and labor intensive if the number of switches forming the associated network is large.

SUMMARY OF THE INVENTION

We have recognized that a better approach to the provisioning of routing and trunking data is to arrange each of the elements forming a telecommunications network, e.g., toll switches, so that they inform the other switches of the network anytime a change in routing or trunking data occurs. That is, if routing and trunking data is changed as a result of, for example, adding a new trunk group to the element, then the element, in accord with an aspect of the invention, forms a message characterizing the change and then transmits the message to each of the other elements forming the network so that latter elements may change their routing and trunking data to account for the change. Accordingly, the provisioning of routing and trunking data in a network is performed automatically, thereby eliminating the need for an NSPC to implement such provisioning. Such automatic provisioning is extended, in accord with another aspect of the invention, to providing a rule-based, end-to-end routing scheme which automatically selects a routing path from multiple candidates based on (a) class-of-service parameters and (b) availability of network capacity. The automatic selection of a routing path thus replaces the provisioning of routing data in the toll switches, which data was priorly needed to select the appropriate path.

Other aspects of the invention will become apparent from the following detailed description.

BRIEF DESCRIPTION OF THE DRAWINGS

In the drawing:

FIGS. 2 and 3 are illustrative examples of respective trunk group data profiles that may be stored in memory internal to associated toll switches;

FIG. 4 is an illustrative example of a data profile for a network addressable destination, e.g., CO 110 of FIG. 1;

FIG. 5 is an illustrative example of a data profile for a trunk group that connects a toll switch to a network addressable destination.

DETAILED DESCRIPTION

Figure 1:
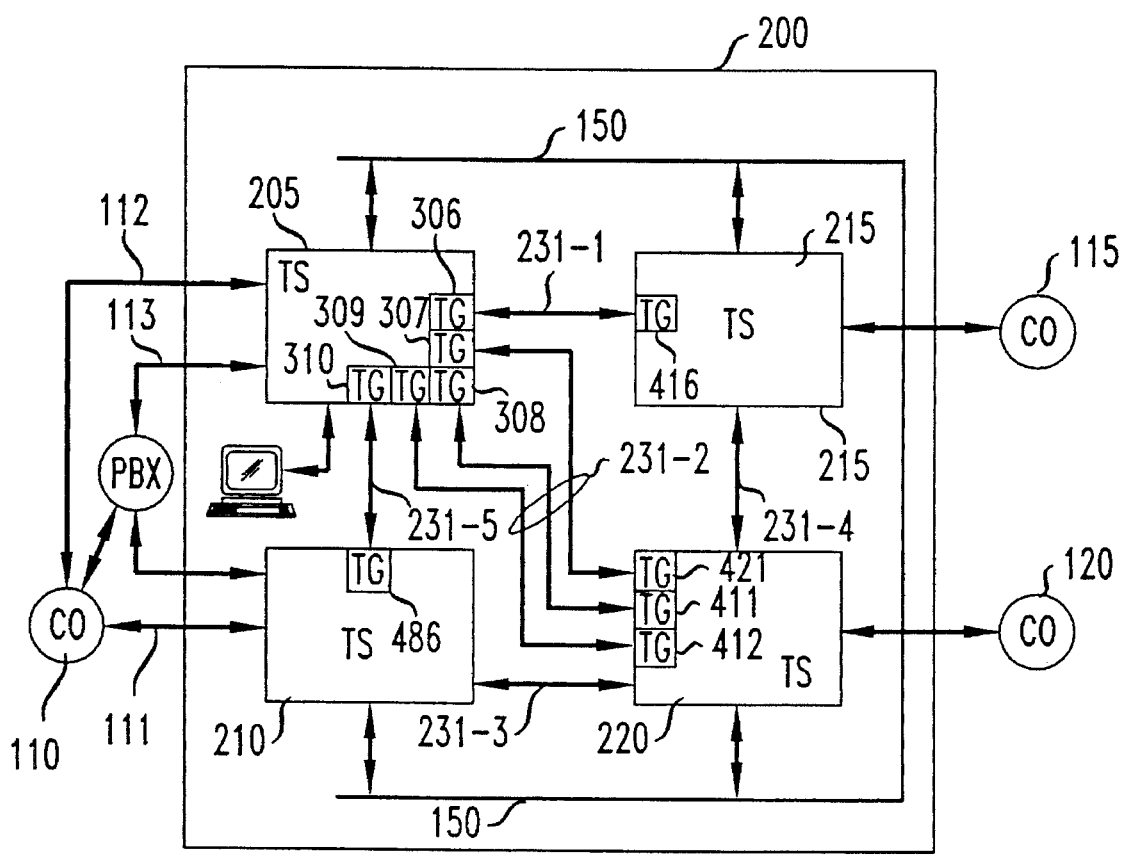
FIG. 1 is a broad block diagram of a telecommunications system in which the principles of the invention may be practiced.

In an exemplary embodiment of the invention, communications network 200, FIG. 1, may be, for example, a public switched telephone network, such as, for example, the well-known AT&T network, that provides long distance telephone services for its subscribers (not shown). Network 200 includes, inter alia, a plurality of Toll Switching (TS) offices, four of which, 205, 210, 215 and 220 are shown in the FIG. Such switches may be any one of the well-known types of switching equipment, and includes, for example, the No. 4ESS (Electronic Switching System) available from AT&T. It is seen from the FIG. that each switch, e.g., TS 220, is connected to a number of other switches via a so-called inter-toll network, e.g., communications paths 231-2 through 231-4, in which paths 231-2 connect trunk groups 411, 412 and 421 to trunk groups 307–309, respectively, etc. (It is seen that other intertoll paths, e.g., path 231-5, similarly interconnect one or more trunk groups, e.g., trunk groups 486 and 310.). Each toll switch may also be connected to a number of Central Offices (CO), e.g., CO 120. The operation of a central office is well-known and will not be discussed herein. However, it suffices to say that a CO is arranged to send to an associated toll switch of network 200 a telephone call originated at a calling telephone station set in which a customer has dialed a particular long distance telephone number. A CO is also arranged to connect a call that the CO receives from an associated toll switch to a called telephone station set.

Assume at this point that TS 205 (also referred to herein as Network Switch Number 205) is being brought "on line" and interconnected with the other toll switches of network 200 for the purpose of processing and routing calls that TS 205 may receive from the other switches. To prepare TS 205 for that event the data that identifies each of its trunk groups and the identity of the toll switch that is respectively connected thereto is stored in memory internal to TS 205 as a trunk group profile. An illustrative example of a trunk group profile for TS (or NSN) 205 is shown in FIG. 2. Trunk group profile table 400 is formed from a plurality of data records, e.g., records 410 and 411, in which each such record comprises a number of data fields for the storage of associated data. For example, field 401 identifies a respective TS 205 trunk group (near end termination); fields 402 and 403 respectively identify the far-end toll switch and its associated trunk group (far-end termination) connected to the trunk group identified in field 401; field 404 identifies the transport capability of the trunk group (e.g., voice or data in which the data rate may be, for example, 64 kbs, 384 kbs or 1536 kbs); field 405 identifies the type of trunk group, e.g., InterToll, and field 406 identifies a Circuit Selection Capability (CSC). Circuit selection capability specifies, for example, that each trunk of the trunk group identified in field 401 subjects voice signals to one or more digital signal processing functions. Such signal processing functions may include, for example, improving the sound quality of the voice signals, detection of DTMF digits entered during a call and after the dialing of the called telephone number, etc. A CSC may also indicate, for example, whether the associated connection is a fiber or satellite connection, involves data compression, etc.

For example, record 410 indicates that the near-end trunk group No. 306 (field 401) of TS 205 connects to the far-end trunk group No. 416 (field 403) of TS 215 (field 402). The record also indicates that the transport capability of trunk group 306 (field 404) is voice and that the CSC of trunk group includes a signal processing function (field 406), e.g., DTMF digit detection.

Once table 400 and other routing tables (not shown) have been populated with the appropriate data, then switch 205 may be "cut-over", i.e., placed into service. At that point, and in accord with an aspect of the invention, switch 205 unloads a copy of each record stored in table 400, forms the record into a message with the message destination field comprising the address identified in field 402 of the associated record. TS 205 then transmits the message, for example, over SS7 network 150. The SS7 network, in turn and in a conventional manner, delivers the message via one or more Signal Transfer Points (STPs, not shown) to the identified destination. For example, assume that the message had been formed from record 411, then the resulting message is delivered to TS 220 via network 150. TS 220, responsive to receipt of the message, updates its own table 400 to show that its near-end trunk group 411 (field 401) is connected to the far-end trunk group 308 (field 403) of TS 205 (field 402). TS 220 also populates associated fields 404 and 405, etc. using the remaining contents of the received message, as illustrated in FIG. 3.

The provision of the trunking and routing data will thus be completed, in accord with the invention, when TS 205 has formed all such messages and transmitted them over network 150 to the other toll switches, respectively. At that point, the toll switches may use TS 205 as a so-called via switch to reach a particular destination. For example, if a call destined for CO 120 (FIG. 1) is placed via CO 115 and TS 215, but the intertoll connection 231-4 between TS 215 and TS 220 is overloaded, then TS 215 may route the call to TS 220 via an alternate path. One segment of such an alternate path could be via paths 231-1 to TS 205 that TS 215 may identify as a result of receiving the provisioning message from TS 205 indicating that its near-end trunk group 416 connects to far-end trunk group 306 of TS 205 and "knows" that TS 205 connects to TS 220, as will be explained below. Another and last segment of the alternate path would be via TS 205 and intertoll connection 231-2. TS 215 may thus route the call via an alternate path involving (trunk group 307 of TS 205) connecting to TS 220 (trunk group 421 of TS 220).

(TS 215 knows that TS 205 connects to TS 220 because automatic provisioning messages had been priorly sent to TS 215.)

As an aspect of network 200, a toll switch thereof may serve one or more external switches, for example, local Central Office (CO) switches. Accordingly, telephone calls may be routed via network 200 between telephone station sets of such COs. Because of this, the routing data that the toll switches of network 200 maintain with respect to such external switches needs to be updated whenever the data changes. This may be readily done, in accord with an aspect of the invention, by maintaining what we call a Network Addressable Destination (NAD) profile (data record) as well as a trunk group profile at a toll switch, e.g., TS 210, for each external switch, e.g., CO 110, that is connected to that toll switch. Accordingly, if a network administrator changes the routing or trunking data associated with an external switch, then all that needs to be done to propagate that change throughout network 200 is to change the assigned NAD or trunk group profile. The associated toll switch in response thereto then broadcasts the change to the other toll switches of the associated network, as will be discussed below. (It is noted that trunking and/or routing data (parameters) will also be referred to herein as call routing data (parameters).)

An illustrative example of a NAD profile (record) 450 is shown for one such external switch, e.g., switch 110, in FIG. 4. A NAD profile/record 450 comprises a number of fields identifying the switch associated with the NAD, telephone number codes and associated routing information. More particularly, fields 451 through 453 respectively identify the address of the external CO switch (HOLMNJ01T), its type (local CO), and the owner of the switch (Bell Atlantic). Fields 454 and 455 respectively identify the numbering plan supported by the switch and associated dialing codes. Fields 456 identify the routing information for the external switch in which such fields may be duplicated to identify all alternate routes to other destination external switches using the external switch identified in field 451 as a via switch. Specifically, fields 456-1 through 456-4 respectively identify the other destination switch (HOMNJAJ or MTNJ10T), type of route (alternate), Transport Capability (voice) and Circuit Selection capability (CSC).

FIG. 5 illustrates an example of a trunk group profile 500 for a particular trunk group, e.g., the trunk group connecting to CO 110. In particular, fields 501 and 502 respectively identify the trunk group ID connecting TS 210 to CO 110 (HOLMNJ01T) and the far-end NAD ID (CO 110) of the trunk group. Field 503 identifies the far-end switch ID that the trunk group is physically connected to if the far-end NAD comprises multiple switches. Field 504 indicates that the trunk group is a "switched access" trunk group. Fields 505 and 506 respectively identify the transport capability and CSC of the trunk group identified in field 501. (Note that the layout of the trunk group profile shown in FIG. 5 is similar to that of the trunk group profile shown in FIG. 2. However, for the sake of simplicity, some of the fields are not shown in FIG. 5.)

To better understand the way in which the contents of a NAD are updated, assume that a new dialing code, e.g., 908-555-0001 to 908-555-9999, is added to CO 110. In that event, then, the NSPC or a craftsperson may interact with TS 210 for the purpose of updating the NAD stored in the TS 210 memory for CO 110. In doing so, the new dialing code is added to field 455 of the NAD. When the update has been completed then, in accord with an aspect of the invention, TS 210 broadcasts the update to the other switches of network 200.

Figure 6:
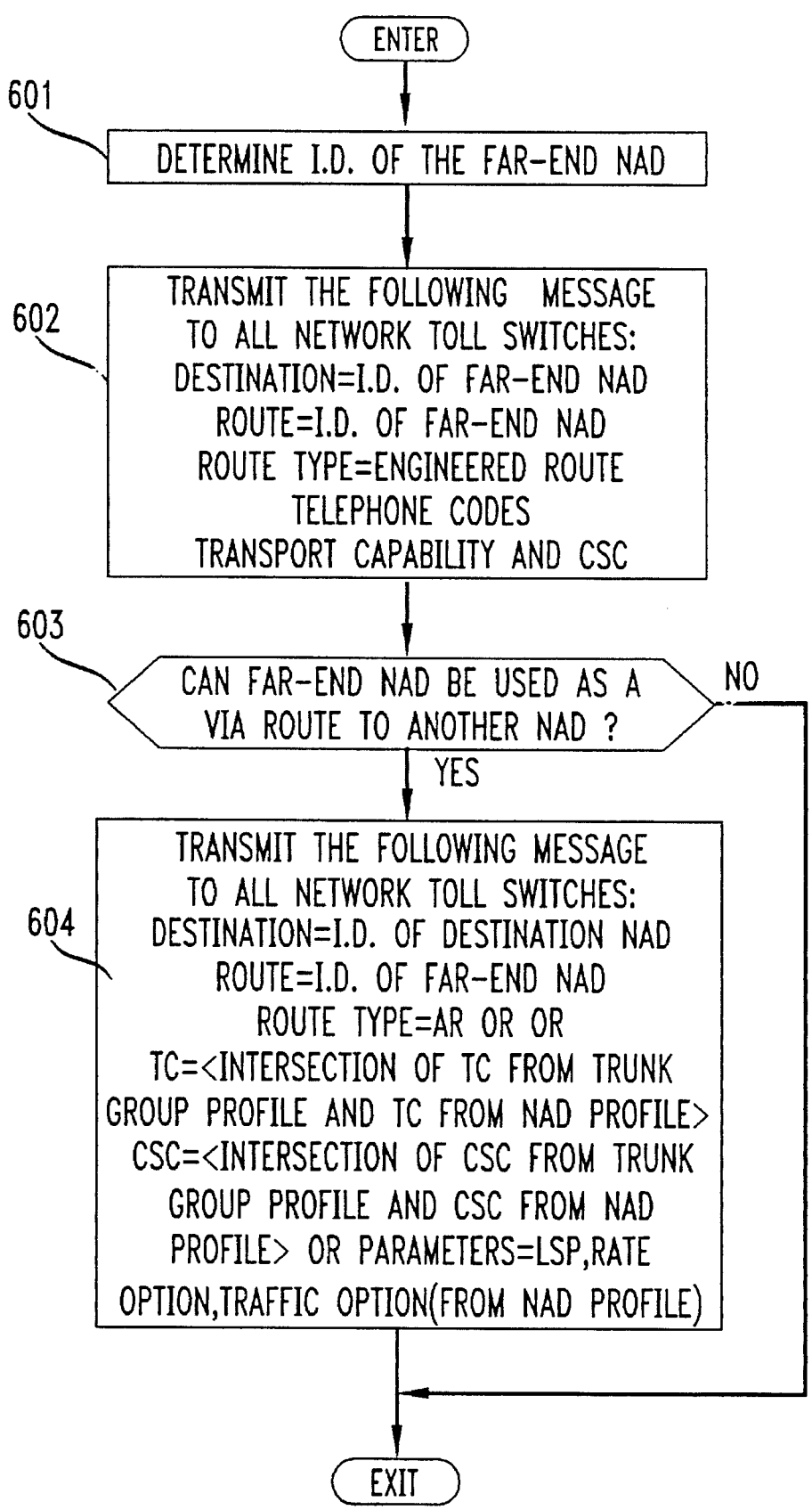
FIGS. 6 through 13 illustrate in flow chart form the program which implements the principles of the invention in a telecommunications network element, e.g., a toll switch of FIG. 1.
Figure 7:
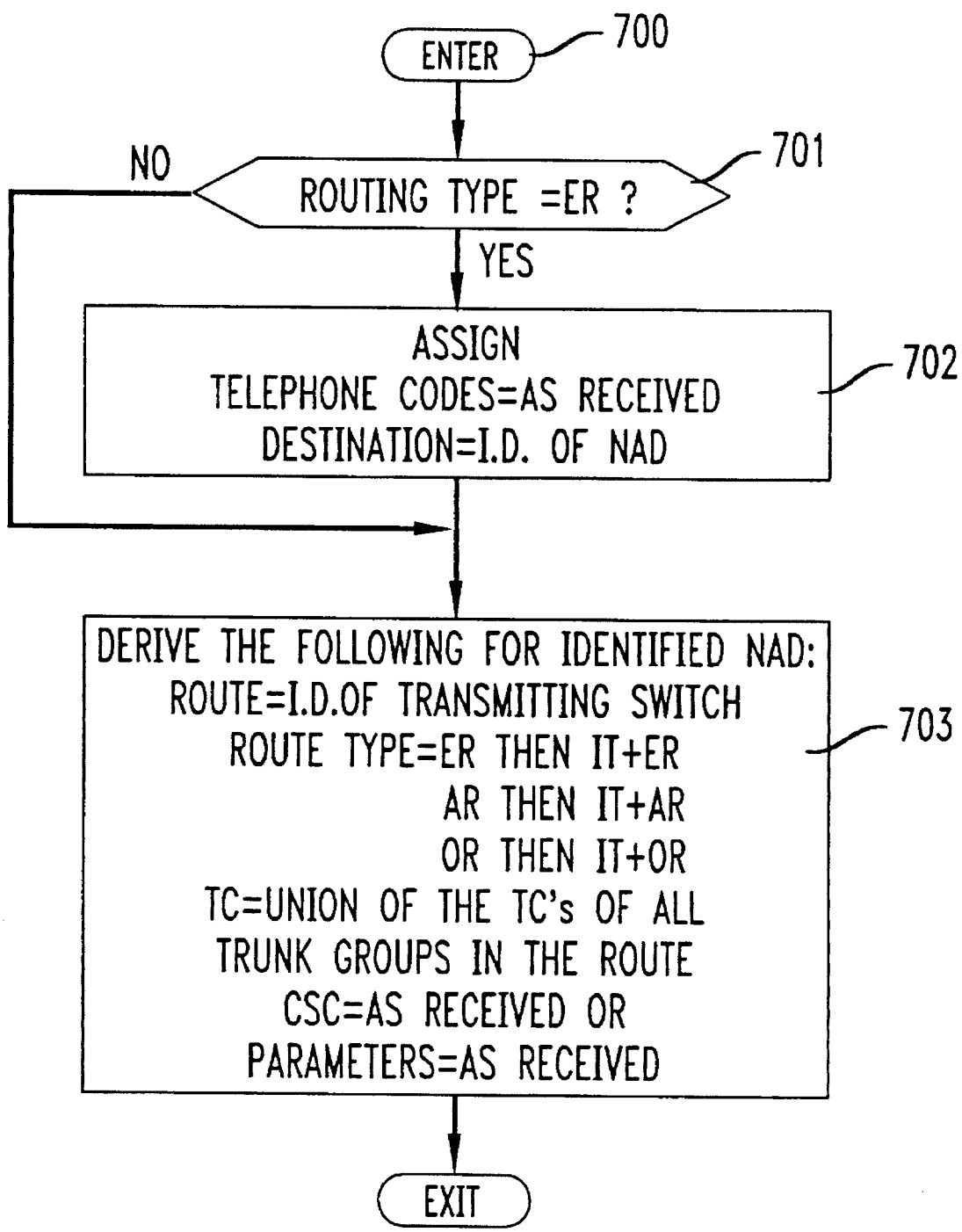

In particular, and referring to FIGS. 1 and 6, the TS 210 call processing program in response to the update (or any type of change to either a NAD or TGP (trunk group profile)

invokes the program that forms a message characterizing the update (or change) and transmits the message to each of the other network 200 toll switches in turn. Upon being invoked, the program proceeds to block 601 (FIG. 6) where it determines from the associated TGP which NAD is affected by the update (or change). When the program identifies that NAD, it then proceeds to block 602 where it forms a message containing the contents of the updated NAD record, e.g., updated record 450 (FIG. 4) and then transmits the message to each of the other network 200 toll switches via SS7 network 150. The program then proceeds to block 603 where it checks to see if fields 456 of the NAD record have also changed. If not, then the program exits. Otherwise, it proceeds to block 604. At block 604, the program forms a message using the contents of fields 451, 456-1 and 456-2 of the associated record. Other segments of the message are also formed from the intersection of (a) NAD field 456-3 and TGP field 504 (FIG. 5), and (b) NAD field 456-4 and TGP field 506. The program then broadcasts the latter message to each of the other network 200 toll switches. It is noted that the term "intersection" mentioned above refers to the commonality between the corresponding fields of the NAD and TGP records. That is, the same Transport Capability (TC) and CSC is specified in both records. For example, if the TC in the NAD field 456-3 is voice and the TC in the TGP field 505 is voice and 64 kbs, then the TC fields intersect and the switch identified in NAD field 451 or in the associated TGP field 501 may be used as an alternate via route for a voice call placed to the switch identified in NAD field 456-1. If the TCs do not intersect, then CO 110 may not be used as a via route to the switch identified in field 456-1 of the associated NAD record. (It is noted that if the TC fields intersect but the associated CSC field do not intersect, then the CO switch, e.g., CO 110, may still be used as a via path to the switch identified in NAD field 456-1 for those calls that prefer, but do not require, a particular CSC type.) When a network 200 toll switch, e.g., TS 215, receives the provisioning message from TS 210, then the TS 215 call processing program invokes the program shown in FIG. 7.

Specifically, when the program is entered at block 700 it proceeds to block 701 where it determines from the contents of the received message if the route from the toll switch, e.g., TS 210, to the external CO switch is an engineered route (i.e., a direct route) or an alternate route. If the former, then the program proceeds to block 702. Otherwise, it proceeds to block 703.

At block 702, the program uses the contents of the received message to update the dialing codes specified in a table that is used to translate such codes into the identity of the associated NAD. (The way in which a toll switch, e.g., TS 210, uses the translation table is explained below in detail.)

The program then proceeds to block 703 where it derives particular routing information from other information contained in the received message and then stores the routing information in a routing table associated with the identified NAD, e.g., CO switch 110. Such information identifies the InterToll (IT) routing to the destination toll switch, e.g., TS 210, serving the identified NAD and includes whether the route from the destination TS to the NAD is an Engineered Route (ER), Alternate Route (AR) and/or overflow route (OR) (where an IT route is a route between toll switches; an ER route is a direct route from a toll switch to a destination NAD; an AR route is a route to the destination NAD via another NAD and an OR route is similar to an AR route but is a "last choice" route). The routing information also includes the CSC and TC associated with the route to the NAD as well as other parameters if the route is identified as an overflow route. The program then exits.

As a further illustrative example of the way in which such provisioning may be automatically implemented in accord with the invention, assume that CO 110 is disconnected from TS 210 and "rehomed" to TS 205. Responsive to the disconnection, TS 210 forms a message identifying destination NAD 110 but containing zeroes in the fields identifying the routing parameters from TS 210 to NAD 110, i.e., dial codes, type of route, TC and CSC. TS 210 then transmits the message to each of the network 200 toll switches. Responsive to receipt of the message, the other toll switches then update their associated translation and routing tables to include the change.

As a result of the rehoming NAD 110 to TS 205, either a craftsperson or the NSPC stores in the memory of TS 205 a profile record for NAD 110, e.g., record 450 (FIG. 4) and a TGP profile for trunk group 112 (FIG. 1) interconnecting NAD 110 to TS 205. Similarly, responsive to the update, TS 205 enters the program of FIG. 6, which, as discussed above, forms a provisioning message characterizing the update (or change) and then transmits the message to the other network 200 toll switches so that they may update their respective translation and routing tables accordingly.

A toll switch may also be arranged so that it automatically calculates a bandwidth allocation value for each of its trunk groups for each of what we call Routing Pattern Identities (RPI), in which a RPI identifies one of a number of different groups of telecommunications services. Thus, in accord with an aspect of the invention, each toll switch automatically provisions (allocates) the level of bandwidth that it will reserve for a particular RPI for a predetermined period of time, e.g., weekly, in which the allocation may be set differently for different periods of the day and for different days of the week. More particularly, a week is divided into a plurality of Load Set Periods (LSPs), for example, 36 LSPs, comprising twelve LSPs for each weekday, in which the LSPs are identical for each weekday; twelve LSPs for Saturday and twelve LSPs for Sunday.

More particularly, a toll switch is arranged to track an estimate of the number of trunks of a particular trunk group that it needs to handle an offered level of traffic associated with a particular RPI. For example, TS 205 may be arranged so that it tracks the number of trunks that it needs to handle calls associated with a particular RPI. This and other such estimates are tracked for calls which TS 205 respectively offers to each of its trunk groups, e.g., trunk groups 306 through 310, during each of the 36 LSPs. At the end of the 36th LSP, toll switch 205 sends via SS7 network 150 the average of the estimated number of trunks needed to forward calls to the toll switch connected to the opposite end of an intertoll path locally connected to the trunk group associated with the traffic load statistic (TLS), e.g., TS 215 for traffic load group 306. Similarly, TS 2 15 sends via network 150 the trunk statistic that it tracked for its trunk group 416 connecting via the intertoll path to TS 205.

Figure 8:
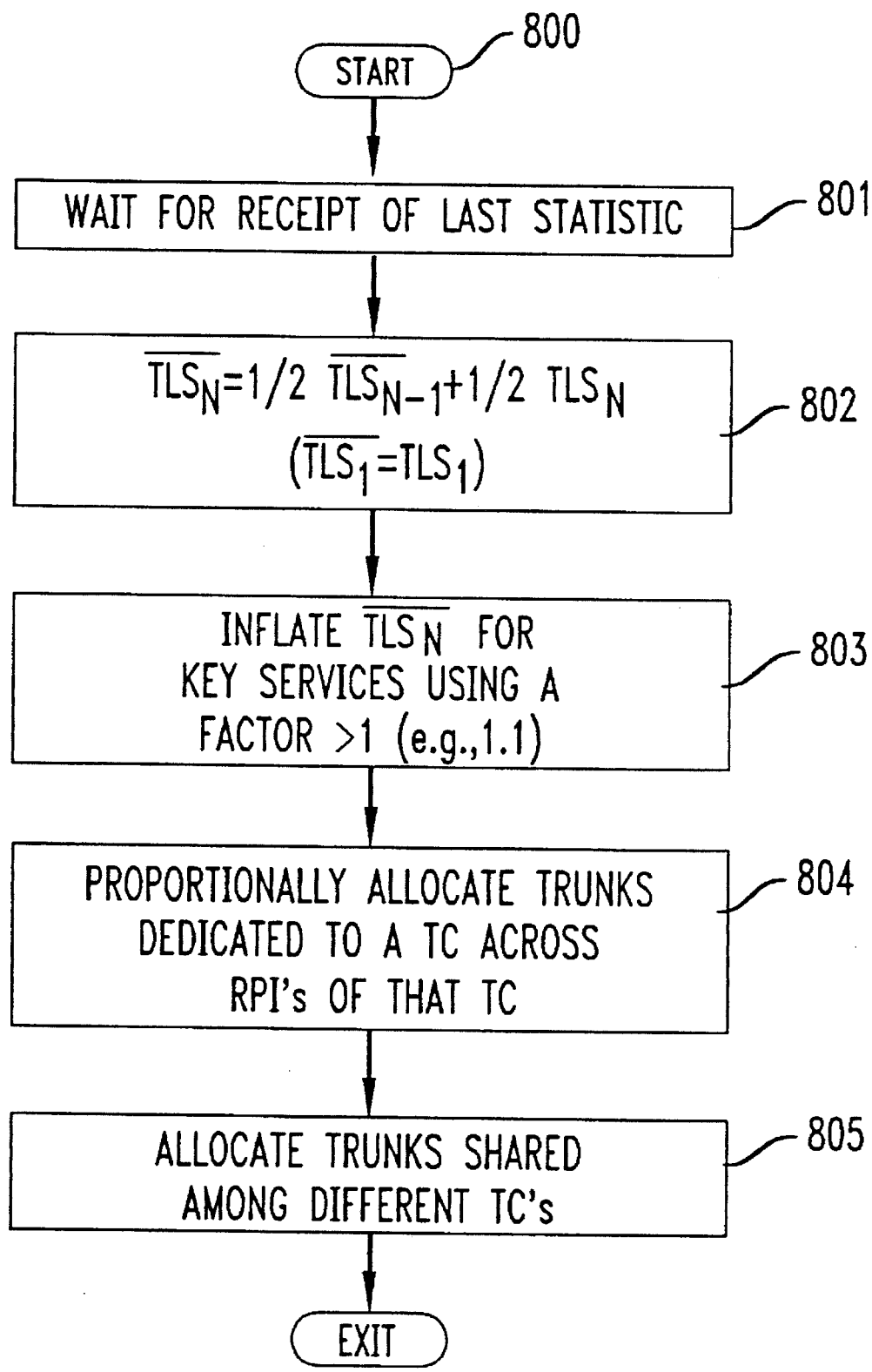

When a toll switch, e.g., TS 205, has completed its transmission of each traffic load statistic for each of its LSPs and LSP traffic load statistics received from the other toll switches respectively connected at the opposite ends of its trunk groups, then toll switch 205 enters the call processing program of FIG. 8 to determine the allocation of bandwidth for each combination of LSP and RPI. Specifically, when entered at block 800, the program proceeds to block 801 and remains at that block until it receives the last of the above-mentioned traffic load statistics. When it receives that statistic, then the program proceeds to block 802 where it performs a "smoothing" function for each traffic load statistic that it receives and each statistic that it generates (tracks). Such smoothing is done in accord with equation (1) shown in block 802. That is, a traffic load statistic is smoothed by adding one-half of the value of the current traffic load statistic (TLSn) to one-half of the value of the traffic load statistic determined for the previous week (TLSn-1). If there is no previous traffic load statistic, then the smoothing function is not performed. When the program completes the smoothing function it then proceeds to block 803, where each of the results determined at block 802 is inflated by a predetermined factor, e.g., a value of 1.1, for each RPI associated with a key service so that the service may be associated with a higher priority over other services.

The program then proceeds to block 804 where it proportionally allocates dedicated trunks across the RPI values for each LSP based on the above-mentioned traffic load statistic. For example, the proportional allocation of trunks dedicated to voice calls to voice RPIs. The program then proceeds to block 805 where it allocates trunks that may be used for either data or voice calls among different transport capabilities (TC). For example, if there are 48 trunks between two switches and each switch needs 20 trunks to handle all data calls that are forwarded to another switch, then based on a proportionality (statistic) of 20:20 or 1:1, 20 trunks are allocated to each switch. The remaining 8 trunks may then be allocated to voice calls if needed. The program then exits.

Figure 9:
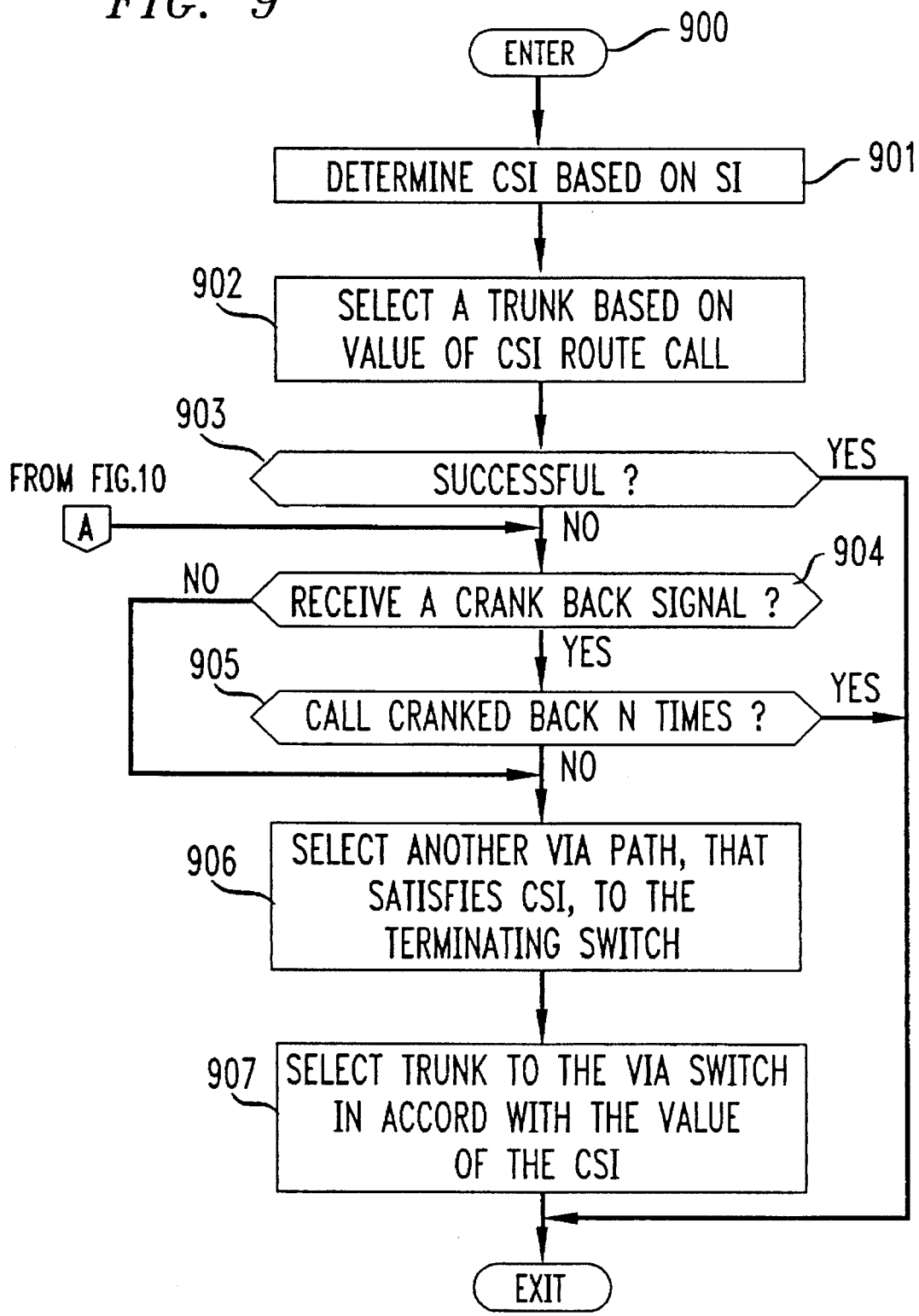

FIG. 9 shows an expanded version of the call processing program which selects a route (trunk) based on a Circuit Selection Index (CSI)) associated with a call that is being processed. Specifically, when the program is entered (block 900) it proceeds to block 901 where it maps a so-called Service Identity (SI) value associated with the call being processed to one of a plurality of different CSI values. In accord with an aspect of the invention, what we mean herein by CSI is the level of preference for a circuit selection capability in the selection of the trunk that will be used to forward the associated call toward its intended destination. The value of a CSI may be associated with a particular status of, for example, required, preferred, last choice, don't care and prohibited. Herein required means that the call must be routed only via a trunk having the specified circuit capability; prohibited means that the call should not be routed via a trunk having a specified circuit capability; preferred means that an attempt will be made to route the call via a trunk having the specified circuit capability; last choice means the logical complement of "preferred", i.e., an attempt will be made to route the call via a trunk that does not have the specified circuit capability (if the attempt fails, then the call may be routed via a trunk having the specified capability); and don't care means that circuit capability is not considered in the routing of the call.

The program (block 902) then selects a trunk on a direct route, in which the selection is based on the determined CSI value. In certain cases, a call may be associated with more than one CSI value. For example, a call associated with a CSI specifying a preference for particular transmission media and the avoidance of particular signal compression equipment.

| ACCEPTABILITY TABLE | | | | |
|---|---|---|---|---|
| Preference Level/Pass Type | 1 | 2 | 3 | 4 |
| Required | Y | Y | Y | Y |
| Prohibited | N | N | N | N |
| Preferred | Y | — | Y | — |
| Last Choice | N | N | — | — |

Figure 10:
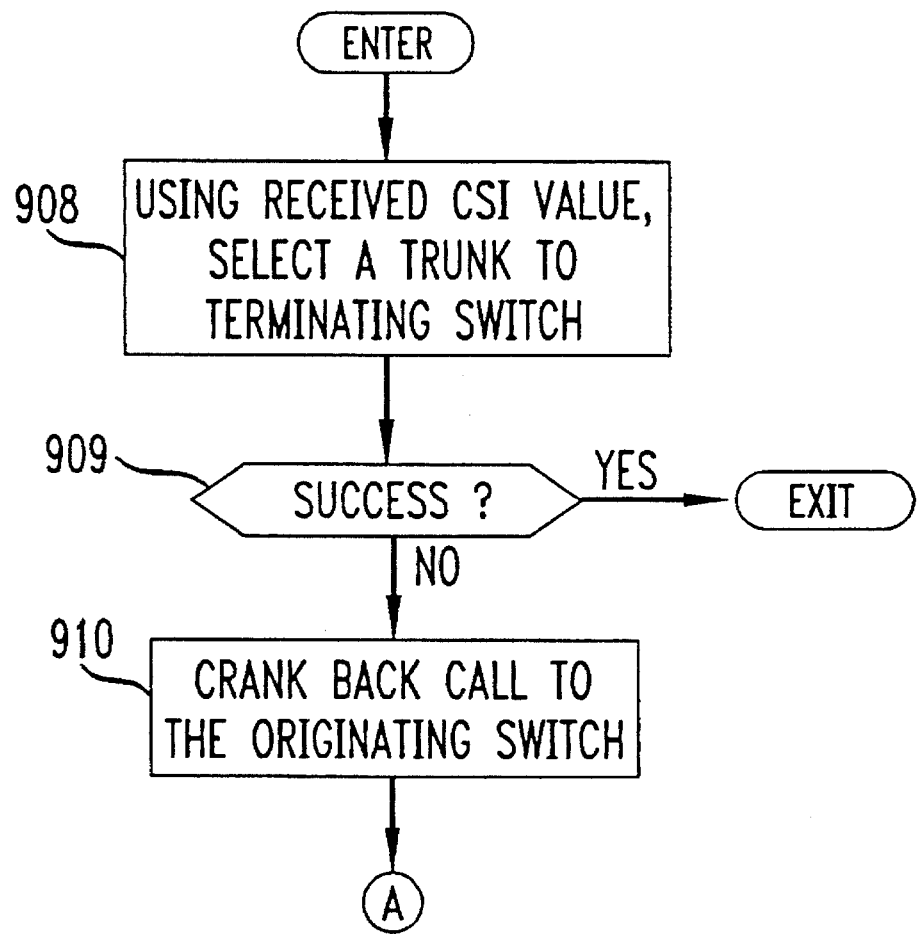

The above Acceptability Table illustrates the selection algorithm that block 902 implements, in which the program may "try" up to four passes to satisfy the selection criteria as closely as possible. On the first pass, the program will select an available trunk that satisfies a "yes" for the required and preferred selections and satisfies a "no" for prohibited and last choice selections. If a trunk satisfying the first pass criteria is not available, then the selection algorithm will make a second pass to locate an acceptable trunk. That is, on the second pass, the program searches for a trunk which satisfies a "yes" for the required choice and satisfies a "no" for prohibited and last choice selections with a don't care for the preferred criterion. If a trunk satisfying the second pass criteria is not available, then the selection algorithm will make a third pass and then a fourth pass if necessary, following the criteria illustrated in the Acceptability Table. The selection algorithm/program proceeds to block 903 when it has completed its task at block 902. The program (block 903) forwards the associated call over the trunk identified by the selection algorithm and then exits if such forwarding was successful (returns to the calling program). If the selection algorithm was not successful (i.e., did not identify an available trunk meeting the criteria specified in the Acceptability Table, then the program (block 904) checks to see if it is processing a call which had been "cranked back" from a via switch—meaning that the call had been returned from the via switch to the origination switch as a result of the via switch being unable to route the call to the destination switch. If not, then the program proceeds to block 906. Otherwise, the program (block 905) checks to see if this call had been "cranked back" a predetermined number of times. That is, the call had been forwarded to n different via switches which could not complete the call and cranked the call back to the originating switch. If that is case, then the program exits (returns control to the calling program with a failure flag). At block 906, the program selects a via switch which might be used to forward the call to its destination. In accord with an aspect of the invention, the selection of a via switch is based on the via switch having trunks that satisfy the CSI criteria specified in the CSC field of the trunk group profile (FIG. 2) associated with the trunk group connecting the via switch and the terminating switch. (As mentioned above, the via switch broadcasts such information to the other switches of the network as part of the automatic provisioning process.) (Note that the selection of the via switch may be done in the manner taught, for example, in U.S. Pat. No. 5,101,451 issued Mar. 31, 1992 to G. R. Ash et al, which is hereby incorporated by reference.) The program (block 907) then, based on the selection algorithm of block 902, selects a trunk to the identified via switch and forwards the associated call and CSI criteria thereto, in which the CSI criteria is sent via the SS7 network 150 (FIG. 1). Control of the call is thus passed to the via switch which enters the program of FIG. 10 to assist in the processing of the call. (Note that the flow of FIG. 10 will be discussed as though it were a continuation of FIG. 9.) At block 908, the program at the via switch enters the selection algorithm (discussed at block 902) to identify an available trunk that may be used to forward the call to the destination switch. If the via switch finds a trunk, then it forwards the call to the destination switch and sends the CSI criteria thereto via the SS7 network 150. The program (block 909) then exits (i.e., sets a return flag to success and returns control to the controlling program). If the program is not successful, then it (block 910) cranks back the call to the originating switch and then exits with the return flag set to "fail". The originating switch then re-enters the program at block 904 (FIG. 9) to continue the processing of the call.

When an originating toll switch, e.g., TS 215, is ready to route a call to a destination NAD, e.g., CO 110, the toll switch may find that one of a number of different terminating toll switches, e.g., TS 205 and TS 210, may be selected to forward the call to the destination NAD. In accord with an aspect of the invention, an originating toll switch may employ what we call a Learning-with-Random-Routing (LRR) scheme (also referred to herein as Rule-Based routing) to select a route to the destination NAD. In such an instance, the originating toll switch will attempt to route the call via a direct egress (ER) if such a route is available. If the attempt is not successful then the originating switch will attempt to route the call via a terminating toll switch which has a direct route to the NAD and which was previously used to route a call successfully to that NAD. If the latter attempt is not successful and each of a number of other toll switches has a direct route (ER) to the destination NAD, then the originating toll switch selects those switches in round robin fashion and attempts to route the call via the selected toll switch. If the latter attempt is not successful, the originating toll switch will then attempt to route the call via an AR route starting with the last toll switch that was used to route a previous call successfully and then selecting other toll switches in turn. If the latter routing is not successful, then it is repeated but using OR routes.

Figure 11:
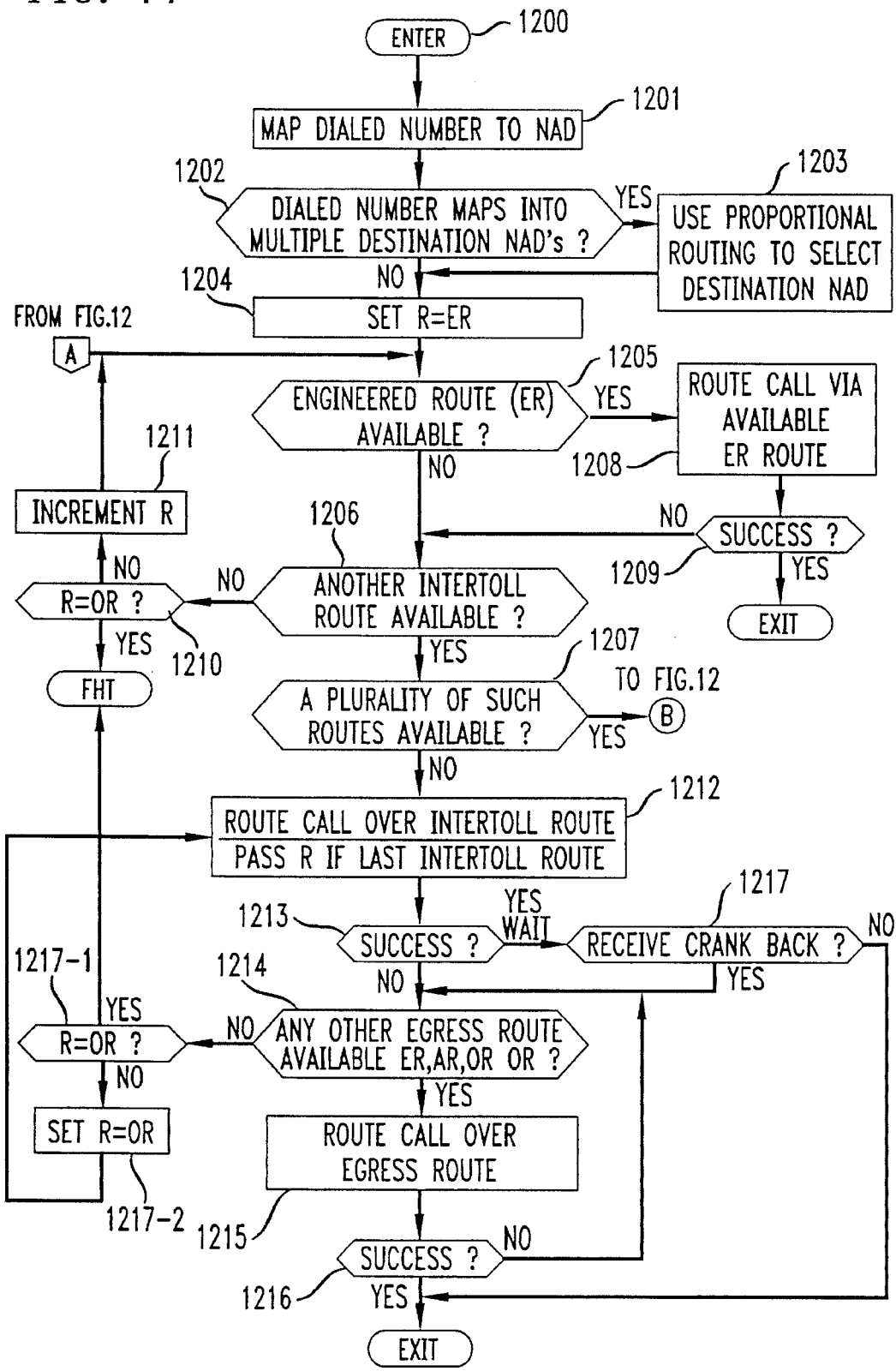

Specifically, when a toll switch, e.g., TS 215 receives a call from a NAD, e.g., NAD (CO) 115, the associated toll switch enters the program of FIG. 11. When so entered (block 1200), the program (block 1201) maps the called telephone number associated with the call into a NAD. If the called telephone number maps into multiple destination NADs (block 1202)—meaning that the call may be processed by one of a plurality of destination NADs associated with respective carriers—then the program (1203) selects, based on proportional routing, a destination NAD that will receive the call. The program (1204) then sets a variable R to ER to indicate that the program should search for an Engineered Route to the identified destination NAD. The program (1205) then checks to see if such an engineered route is available to forward the call toward its destination. If that is the case, then the program ( block 1208) causes the call to be routed via the engineered route to the identified NAD based on the associated CSI criteria. The program (block 1209) then checks, in a conventional way, if such routing was completed successfully. If so, then the program exits.

If an engineered route (ER) is not available, then the program (block 1206) checks to see if it can route the call via another intertoll switch, and identifies a number of other toll switches that may be used to route the call, if any, in the manner taught, for example, by the above-mentioned RTNR patent. If it cannot route the call as desired, then the program (block 1210) checks the variable R to see it is already set to using an Overflow Route (OR). If so, then the program exits by passing the call to a conventional call processing program which processes the call using Final call Handling Treatment—i.e., returns a busy tone, announcement or some other treatment to the calling station.

If R is not set to OR, then the program (block 1211) increments R from ER to AR (Alternate Route) or from AR to OR, as the case may be, and then returns to block 1205.

Figure 12:
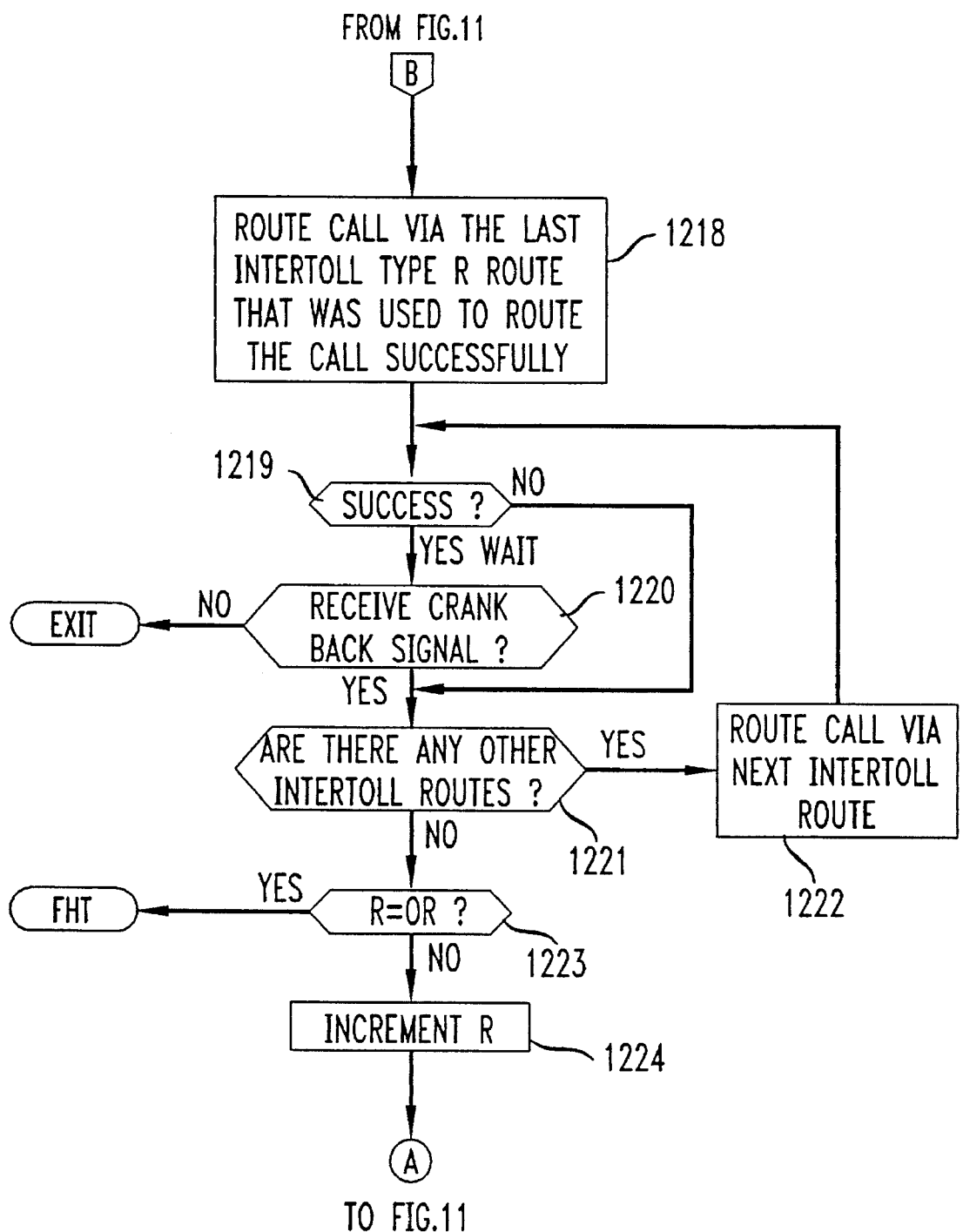

If an intertoll route is available, then the program (block 1207) checks to see if a plurality of intertoll routes are available. If so, then the program (block 1218, FIG. 12) routes the call via the last intertoll route that was used to successfully route a prior call toward a destination NAD and via a trunk of that route that meets any CSI criteria associated with the call. In doing so, the program causes the value of R to be passed to the terminating toll switch. The program (block 1219), then checks to see if the routing of the call was successful. If no, then the program proceeds to block 1221 to search for another intertoll route. If yes, then the program (block 1220) waits for a predetermined period of time and then checks to see if a conventional crank back signal was received from the terminating toll switch. If no, then the program exits. If yes, then the program (block 1221) checks to see if the call can be routed via another one of the plurality of intertoll routes and proceeds to block 1222 where it routes the call via a next one of such routes in the manner done at block 1218. In addition, the program (block 1221) checks to see if the next intertoll switch is the last of the identified multiple toll switches and, if that is the case, sends an indicator indicating that the toll switch is the last toll switch that can route the call toward the destination NAD. If another one of the intertoll routes is not available, then the program (block 1223) checks to see if R equals OR and exits via FHT if that is the case. Otherwise, the program (block 1224) increments R from ER to AR or from AR to OR and returns to block 1205 (FIG. 11).

If multiple intertoll routes are not available (block 1207)—meaning that only one intertoll route is available—the program (block 1212) routes the call to the latter toll switch. In doing so, the program causes the value of R to be sent to that switch as well as an indicator indicating that the routing is the last terminating toll switch that may be used as route type R to route the call toward the destination NAD. The program (block 1213) checks to see if such routing was successful. If so, then the program (block 1217) waits a predetermined period of time to see if it receives a crank back signal. If no, then the program exits. If yes, then the program (block 1214) checks to see if there is any egress route (ER, AR or OR type) available to route the call toward its destination. If no, then the program (block 1217-1) checks to see if R equals OR. If not, then the program (block 1217-2) sets R=OR and returns to block 1212. Otherwise, the program exits (FHT) by passing the call to a conventional call processing program which processes the call using Final call Handling Treatment—i.e., returns a busy tone, announcement or some other treatment to the calling station.

If any egress route is available (e.g., route 111 or 113, FIG. 1) then the program (block 1215) routes the call via that egress route and then checks to see (block 1216) if such routing was successful. If yes, then the program exits. Otherwise it returns to block 1214.

Figure 13:
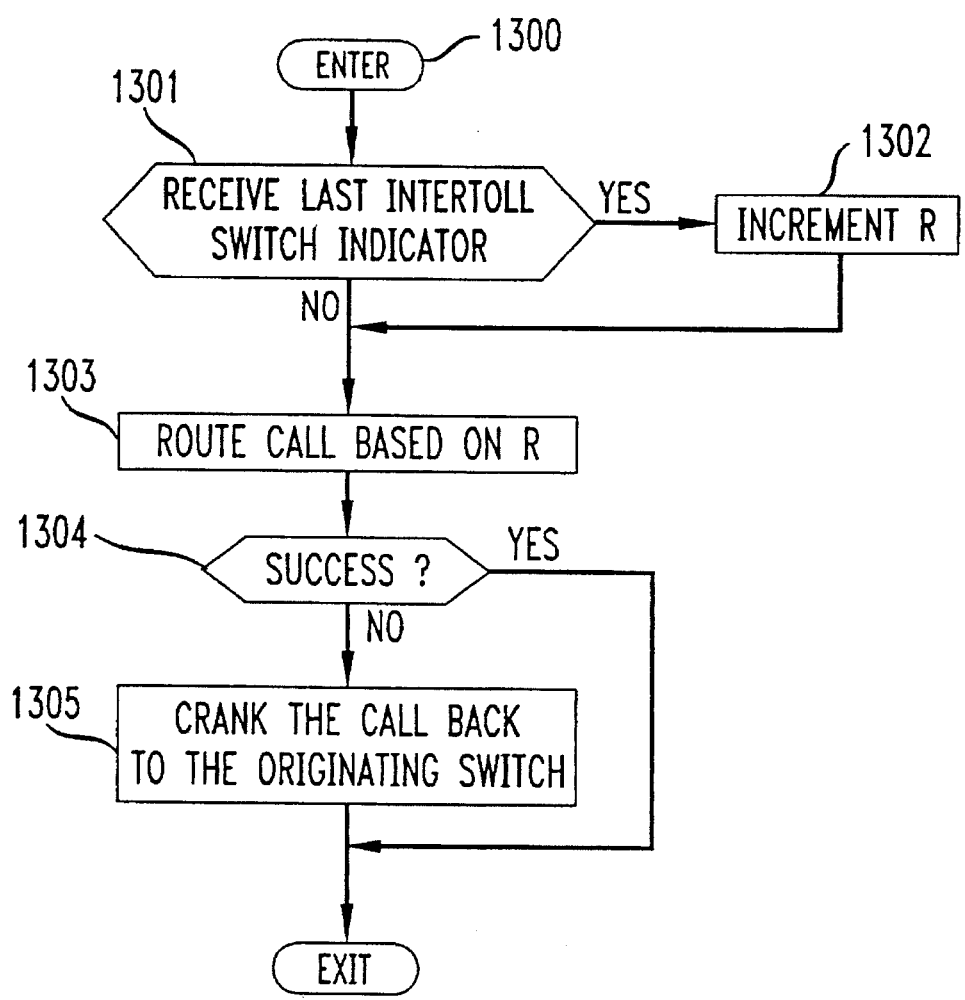

FIG. 13 illustrates the program that is entered at the terminating toll switch responsive to receipt of the telephone call, in which the associated routing type indicator has a value of variable R. When entered (block 1300) the program (block 1301) checks to see if it received the last-terminating-toll-switch indicator with the call. If yes, the terminating toll switch increments R (block 1302) from ER to AR or from AR to OR. The program (block 1303) then routes the call via an egress route selected as a function of the value of R. That is, if R equals ER, then the egress route is selected from the engineered routes to the NAD; if R equals AR, then the route may be of the ER or AR type; or if R equals OR, then the route may be of the ER, AR or OR type. The program (block 1304) checks to see if such routing was successful and exits if that is the case. Otherwise, the program (1305) cranks the call back to the originating toll switch and then exits.

The foregoing is merely illustrative of the principles of the invention. Those skilled in the art will be able to devise numerous arrangements, which, although not explicitly shown or described herein, nevertheless embody those principles that are within the spirit and scope of the invention.

The invention claimed is:

1. An arrangement for provisioning call processing parameters in a telecommunications network, said network comprising a plurality of interconnected switches, said arrangement comprising:

means, responsive to an equipment change affecting particular trunking or routing parameters associated with one of said plurality of switches, for changing in said one of said plurality of switches call processing routing data associated with said change, and means, in said one of said plurality of switches and responsive to said change, for forming a message characterizing the change in said associated call processing routing data and then sending said message to each of the other ones of said plurality of switches.

2. The arrangement set forth in claim 1 wherein said call processing routing data include trunking and routing parameters and wherein said change is a change in a trunk group data profile specifying the trunking and routing parameters associated with a trunk group internal to said one of said switches and wherein said trunking and routing parameters include data specifying a circuit selection capability for said internal trunk group.

3. The arrangement set forth in claim 2 wherein said circuit selection capability specifies whether intertoll connections to respective trunks of the associated trunk group are optical fiber connections.

4. The arrangement set forth in claim 2 wherein said circuit selection capability specifies whether intertoll connections to respective trunks of the associated trunk group are via radio satellite.

5. The arrangement set forth in claim 2 further comprising in said one of said switches means operative, for provisioning purposes, for automatically determining and allocating for different load set periods of time of respective repeating predetermined periods of time respective levels of bandwidth to each routing pattern identify value associated with said trunk group.

6. The arrangement set forth in claim 2 further comprising in said one of said switches means, operative for provisioning purposes, for automatically allocating for a predetermined period of time a predetermined level of bandwidth to each routing pattern identity value associated with said trunk group.

7. The arrangement set forth in claim 6 wherein said means for automatically allocating includes means, at the termination of said predetermined period of time, for calculating said allocation for a succeeding predetermined period of time.

8. The arrangement set forth in claim 2 wherein said circuit selection capability specifies a signal processing function that will be applied to voice signals transported over the associated trunk group.

9. The arrangement set forth in claim 8 wherein said signal processing function is a signal enhancement function.

10. The arrangement set forth in claim 8 wherein said signal processing function is a Dual Tone MultiFrequency (DTMF) digit detection function.

11. The arrangement set forth in claim 8 wherein said signal processing function is a data compression function.

12. The arrangement set forth in claim 1 wherein said one of said switches is connected to at least one central office switch disposed external to said network via at least one trunk group internal to said one switch and wherein said call routing parameters include a data Network Addressable Destination (NAD) data record associated with said trunk group and wherein said NAD data record includes data identifying (a) an address of said one central office switch, (b) dialing codes supported by said one central office switch, (c) transport capability of said one trunk group, and (d) circuit selection capability of said one trunk group.

13. The arrangement set forth in claim 12 wherein said change is a change in the dialing codes supported by said one central office switch.

14. The arrangement set forth in claim 12 further comprising in said one switch:

means, responsive to receipt of a call and a called telephone number from a Central Office switch, for translating said telephone number into a network addressable destination and responsive to such translation for forwarding said call to said network addressable destination, and means, responsive to said telephone number translating into a plurality of network addressable destinations, for selecting one of said plurality of network addressable destinations as a function of a proportional routing method and for then forwarding said call to the selected network addressable destination.

15. The arrangement set forth in claim 1 further comprising in another one of said switches means, responsive to receipt of said message, for changing the call processing routing data associated with said other one of said switches in accord with the contents of said received message.

16. The arrangement set forth in claim 1 further comprising means for associating a telephone call received at said one of said switches with a circuit selection index, in which said circuit selection index is a level of preference for a circuit selection capability that is used by said one of said switches to select a trunk that will be used to forward said call toward its destination.

17. The arrangement set forth in claim 16 wherein said level of preference includes (a) required, meaning that said call may be routed only via a trunk having a particular circuit capability; (b) preferred, meaning that an attempt should be made to route the call via a trunk having the specified circuit capability; (c) last choice, which is the logical compliment of the preferred level of preference; (d) prohibited, meaning that the call should not be routed via a trunk having a specified circuit capability; and (e) don't care, meaning that circuit capability should not be considered in the routing of the call.

18. The arrangement set forth in claim 16, wherein said means for associating includes means for forwarding said call to said destination via a trunk selected in accord with the circuit selection index associated with said call in which the selected trunk is connected to another one of said switches and for also forwarding said circuit selection index to said other one of said switches so that said call may be forwarded from said other switch toward said destination via a trunk of said other switch selected as a function of said circuit selection index.

19. An arrangement for provisioning call processing parameters in a telecommunications network, said network comprising a plurality of interconnected switches, said arrangement comprising;

means, responsive to a change in particular equipment associated with one of said plurality of switches, for changing in said one of said plurality of switches call processing routing data associated with said particular equipment, and means, in said one of said switches and responsive to said changing, for forming a message characterizing the change in said associated call processing routing data and then sending said message to each of the other ones of said plurality of switches.

20. Apparatus comprising:

a telecommunications network formed from a plurality of interconnected switches, means, responsive to a change in a connection between first and second ones of said switches, for causing said first and second ones of said switches to form respective messages characterizing said change as it respectively pertains to said first and second switches, and means in each of said first and second switches for sending the associated message to each of the other ones of said switches.

21. A method of provisioning call processing parameters in a telecommunications network, said network comprising a plurality of interconnected switches, said method comprising the steps of:

responsive to an equipment change affecting particular trunks associated with one of said plurality of switches, changing said call processing parameters in said one of said plurality of switches, and forming a message characterizing said change, and responsive to the forming of said message, sending said message to each of the other ones of said switches.

22. A method of forwarding a telephone call in a telecommunications network comprising a plurality of switches, said call being forwarded to a Network Addressable Destination (NAD), said method comprising the steps of:

(a) selecting a direct route from a first switch to said NAD using a last successful direct route and forwarding said call to said NAD via said last successful direct route, (b) if said call cannot be forwarded to said NAD via said last p successful direct route from said first switch to said NAD, then identifying a second switch having a direct route to said NAD in which the latter direct route was previously used to route a call to said NAD successfully and forwarding said call to said second switch, and, if the routing of said call via said second switch is successful, then storing the identity of said second switch as the new successful direct route, and (c) if said call cannot be forwarded to said NAD via a direct route of said second switch, then identifying a number of other switches each having a direct route to said NAD and forwarding said call to each of said other switches, in turn, until said call is forwarded successfully to said NAD, and, if the routing said call via one of said other switches is successful, then storing the identity of said one of said other switches as the new successful direct route.

23. The method of claim 22 further comprising the step of (d) if said call cannot be forwarded to said NAD via one of said other switches then repeating steps (b) and (c) using a last successful alternate route (AR) or finding a new successful alternate route.

24. The method of claim 23 further comprising the step of (e) if said call cannot be forwarded to said NAD via a last successful alternate route (AR) then repeating steps (b) and (c) using an overflow route (OR) used successfully to route a prior call to its destination or another such overflow route.

25. A method of forwarding a telephone call in a telecommunications network comprising a plurality of switches, said call being forwarded to a Network Addressable Destination (NAD), said method comprising the steps of:

(a) selecting a direct route from a first switch to said NAD and forwarding said call to said NAD via said direct route, (b) if said call cannot be forwarded to said NAD via said direct route from said first switch to said NAD, then identifying a second switch having a direct route to said NAD in which the latter direct route was previously used to route a call to said NAD and forwarding said call to said second switch, and (c) if said call cannot be forwarded to said NAD via a direct route of said second switch, then identifying a number of other switches each having a direct route to said NAD and forwarding said call to each of said other switches, in turn, until said call is forwarded successfully to said NAD.

* * * * *